United States Patent
Van Winkelen et al.

(10) Patent No.: US 6,395,182 B1
(45) Date of Patent: May 28, 2002

(54) METHOD FOR PURIFYING WATER, IN PARTICULAR GROUND WATER, UNDER ANAEROBIC CONDITIONS, USING A MEMBRANE FILTRATION UNIT, A DEVICE FOR PURIFYING WATER, AS WELL AS DRINKING WATER OBTAINED BY USING SUCH A METHOD

(75) Inventors: Jacobus Cornelis Van Winkelen, Leeuwarden; Walterus Gijsbertus Joseph Van Der Meer, Sneek, both of (NL)

(73) Assignee: Barrett Enclosures, Inc., Seattle, WA (US)

( * ) Notice: Subject to any disclaimer, the term of this patent is extended or adjusted under 35 U.S.C. 154(b) by 0 days.

(21) Appl. No.: 09/555,191

(22) PCT Filed: Nov. 17, 1998

(86) PCT No.: PCT/NL98/00659
§ 371 (c)(1),
(2), (4) Date: Jul. 20, 2000

(87) PCT Pub. No.: WO99/26886
PCT Pub. Date: Jun. 3, 1999

(30) Foreign Application Priority Data

Nov. 26, 1997 (NL) ............................................ 1007620

(51) Int. Cl.⁷ .............................................. B01D 61/00
(52) U.S. Cl. ...................... 210/652; 210/636; 210/170; 210/195.2; 210/257.2; 210/333.1
(58) Field of Search ................................ 210/636, 650, 210/652, 195.2, 257.2, 333.01, 333.1, 170

(56) References Cited

U.S. PATENT DOCUMENTS

| | | | | |
|---|---|---|---|---|
| 3,912,624 A | * | 10/1975 | Jennings | |
| 3,992,301 A | * | 11/1976 | Shippey et al. | |
| 4,592,841 A | * | 6/1986 | Ancelle et al. | |
| 5,888,401 A | * | 3/1999 | Nguyen | |
| 6,082,373 A | * | 7/2000 | Sakurai et al. | |
| 6,139,724 A | * | 10/2000 | Strohm et al. | |
| 6,142,312 A | * | 11/2000 | Uemura | |
| 6,217,770 B1 | * | 4/2001 | Haney et al. | |

FOREIGN PATENT DOCUMENTS

| | | | |
|---|---|---|---|
| GB | 1535832 | * | 12/1978 |
| JP | 126299 | * | 10/1994 |
| NL | 8200080 | * | 1/1983 |

* cited by examiner

Primary Examiner—Ana Fortuna
(74) Attorney, Agent, or Firm—Seed Intellectual Property Law Group PLLC

(57) ABSTRACT

The present invention relates to a method for purifying water, in particular ground water, under anaerobic conditions, using a membrane filtration unit, wherein the following steps are carried out: 1) connecting the membrane filtration unit (8) to a rinsing unit (11); then 2) passing a rinsing agent from the rinsing unit (11) through the membrane filtration unit (8) so as to create anaerobic conditions in the membrane filtration unit (8); and 3) passing the water to be purified through the membrane filtration unit (8), in which anaerobic conditions have thus been created in step 2), wherein the connection (12) between the membrane filtration unit (8) and the rinsing unit (11) is then shut off so that the anaerobic conditions in the membrane filtration unit (8) obtained in step 2) are maintained while the water to be purified is passed through said membrane filtration unit (8). The present invention furthermore relates to a device for purifying water, and to drinking water obtained by using such a device and/or method.

18 Claims, 3 Drawing Sheets

METHOD FOR PURIFYING WATER, IN PARTICULAR GROUND WATER, UNDER ANAEROBIC CONDITIONS, USING A MEMBRANE FILTRATION UNIT, A DEVICE FOR PURIFYING WATER, AS WELL AS DRINKING WATER OBTAINED BY USING SUCH A METHOD

The present invention relates to a method for purifying water, in particular ground water, under anaerobic conditions, using a membrane filtration unit. The present invention furthermore relates to a device for purifying water, in particular ground water, under anaerobic conditions, using a membrane filtration unit which is provided with the necessary valves, supply and discharge pipes and pumps, and to drinking water obtained by using such a method.

Netherlands patent application 82 00080, which is laid open to public inspection, relates to a method for obtaining water by using membrane filtration, whereby it is stated that the water to be filtrated must be prevented from coming into contact with air. If the water contains iron compounds, for example, said iron compounds will be converted into solid substances under the influence of the ambient air, which solid substances will then deposit on the membranes. In order to prevent contact with the ambient air, the mouth of the borehole to the aqueous liquid is sealed substantially gastight. In practice it has become apparent, however, that a considerable amount of flocks is formed when such a plant is started, which flocculation can be ascribed mainly to the presence of air in the supply pipes and to the membrane surface (which is still dry). Thus, said method is unsuitable for permanent filtration of water under anaerobic conditions.

From "Handbook of Water Purification", 1981, Walter Lorch, page 307, it is known that ferrous ions in feed water oxidize into ferric ions under the influence of oxygen, which results in precipitation.

Japanese patent publication No. 58 133885 relates to a method for removing dissolved oxygen from liquids. Thus, the liquid is brought into continuous contact with gaseous nitrogen, after which the dissolved oxygen is removed together with gaseous nitrogen in a liquid tank. Then the liquid, from which the oxygen has been removed, is supplied to a membrane filtration unit of the reverse osmosis type.

Japanese patent No. 06 126299 relates to a water treatment plant which is successively provided with an active carbon filter, a de-aeration element, as well as a membrane filtration unit of the reverse osmosis type, whereby the water to be treated, which contains dissolved oxygen, is continuously passed through the de-aeration element.

Japanese patent publication No. 58 011091 relates to a method for de-aerating water, wherein first a flocculation agent and a auxiliary substance are injected into the liquid to be treated, which contains oxygen. Then the flow of water thus pre-treated is passed through a sand filter, after which the obtained filtrate is continuously passed through a de-aeration unit. The water thus obtained, from which the oxygen has been removed, is mixed with a reduction agent, for example a sulfite compound, and subsequently supplied to a membrane unit.

Japanese patent publication No. 61 050654 relates to a method for removing dissolved oxygen from washing water by injecting a deoxidizer into the washing water, and subsequently supplying said washing water to a de-aeration unit for the purpose of removing the dissolved oxygen and the carbon dioxide that remain, after which the washing water thus treated is supplied to a membrane filtration unit of the reverse osmosis type.

The above-discussed Japanese patent publications all relate to the continuous removal of oxygen from an oxygen-containing water flow, after which the water flow from which the oxygen has thus been removed is supplied to a membrane filtration unit. The objective of the present invention, on the other hand, is to clear the membrane filtration unit and the valves, pipes, pumps and the like connected thereto of oxygen, or at least to a considerable extent, during the starting phase, whereby the dissolved oxygen that may be present in the water to be purified is in particular not subjected to an additional treatment, so that the water to be purified comprising the dissolved oxygen that is inherently present therein is carried to a membrane filtration unit, in which anaerobic conditions have been created. After all, in practice mainly ground water will be used, which ground water is already contained in the ground under substantially anaerobic conditions, so that it is in particular desirable to maintain said anaerobic conditions during said membrane filtration rather than remove any remaining dissolved oxygen in advance from the aqueous flow to be purified, as the oxygen content thereof is too low to cause flocculation, which is harmful to the membrane filtration unit. The oxygen from the ambient air will cause flocculation, however, in particular the air which is present in pipes, pumps and in the membrane filtration unit.

Such a method for purifying water, using a membrane filtration unit, is also known from European patent application No. 0 655 418, for example. According to the method disclosed in said publication, the water to be purified is supplied to a reactor in which filter membranes are present. The reactor is furthermore provided with a pipe for discharging floating constituents, and with a pipe for discharging settled constituents. Such constituents are formed mainly by oxidation of metals, which oxidized metals are insoluble in the water. The water to be treated which is present in the reactor is injected with ozone so as to suppress the growth of biological constituents, which constituents have an adverse effect on the membrane filtration process. One drawback of such a method is the fact that contamination of the membranes occurs after some time, in spite of the fact that ozone is injected and that floating and settled constituents are discharged. Said contamination may be caused by the organic substances (macromolecules, biomolecules) and other organic substances (colloids, iron hydroxides, manganese hydroxides, calcium salts and the like) which are present in the water to be treated. In addition to that, also bacteria, algae and the like may cause contamination of the membrane surface.

Such contamination of the membrane surface may be of a reversible or of an irreversible nature. In the case of reversible contamination, the membrane surface can be cleaned by rinsing it with a special solution, for example a soap, acid or lye solution. From practice it is known, however, that frequent, that is, monthly cleaning may reduce the life of the membranes considerably, so that the cost of the plant may increase considerably. In the case of irreversible contamination, it is not possible to clean the membrane surface with the above-mentioned agents. The contamination cannot be removed at all and, depending on the rate of contamination, this may result in a very short life of the membranes, which is generally accompanied with a decrease in the productivity. Thus, the cost of the plant will increase considerably.

One way of preventing or strongly reducing contamination which is frequently used in practice is to subject the water to be purified to a pre-treatment. In the embodiment wherein ground water is purified, such a pre-treatment generally consists of an aeration step and one or more filtration steps. In the embodiment wherein surface water is purified, such a pre-treatment consists of a coagulation step, a flocculation step and a filtration step. In both filtration steps, which are carried out under aerobic conditions, suspended substances and iron and manganese flocks, which flocks are considered as iron and manganese hydroxides, are removed to a considerable degree from the starting material to be treated. Although the iron content and the manganese content can thus be reduced to <0.02 and <0.0005 mg/l respectively, the membranes must still be cleaned two to four times a year on average in order to maintain a reasonable water production per membrane element. One drawback of such a pre-treatment is the fact that additional plants must be built, so that the total cost will increase. Besides, such plants require the possible addition of further chemicals, which chemicals may have an adverse effect on the quality of the eventual drinking water. Moreover, malfunctions do occur with such plants, which malfunctions may disturb the production of the eventual drinking water.

The objective of the present invention is to provide a device and a method for purifying water, in particular ground water, using a membrane filtration unit, which method eliminates the aforementioned drawbacks of the prior art.

It is in particular desirable to develop a method and a device for purifying water wherein the pumped-up ground water can be directly supplied to a membrane filtration unit, without serious contamination of the membrane surface occurring thereby.

Another objective of the present invention is to provide a method and a device for purifying water, wherein the concentrate flow obtained at the membrane filtration unit can be discharged in an advantageous manner.

The method as referred to in the introduction is according to the present invention characterized by the following steps:

1) connecting the membrane filtration unit to a rinsing unit; then 2) passing a rinsing agent from the rinsing unit through the membrane filtration unit so as to create anaerobic conditions in the membrane filtration unit; and 3) passing the water to be purified through the membrane filtration unit, in which anaerobic conditions have thus been created in step 2), wherein the connection between the membrane filtration unit and the rinsing unit is then shut off so that the anaerobic conditions in the membrane filtration unit obtained in step 2) are maintained while the water to be purified is passed through said membrane filtration unit.

Subjecting the ground water to a purification under anaerobic conditions (no oxygen) in a membrane filtration unit will prevent the presence of mainly iron and manganese hydroxides in the form of flocks in the water to be treated, thus preventing contamination or, in the worst case, clogging of the membrane. In addition to that, aerobic bacterial growth is not possible, due to the absence of oxygen. The advantage of purification under anaerobic conditions is the fact that the pre-purification steps as described before, which are frequently used in practice, are no longer required, which will reduce the cost of investment and exploitation. It should be apparent that the term "membrane filtration unit in which anaerobic conditions have been created" as used therein is understood to mean that anaerobic conditions have been created in all pipes, pumps, valves and the like which are connected to the membrane filtration unit.

Although the term ground water will consistently be used in the following description, it should be apparent that besides ground water, also the processing of surface water, process water, industrial water and any other aqueous flow, whereby anaerobic conditions are desirable, is possible by using the method according to the present invention.

The membrane filtration unit to be used in accordance with the present invention is in particular not critical, reverse osmosis (also known as hyperfiltration), nanofiltration as well as ultrafiltration and microfiltration can be used. It is preferred, however, to use nanofiltration or reverse osmosis, in connection with the removal of particles having a particle size of less than about 10 nm. Thus, dissolved ions and organic components are stopped by means of nanofiltration and hyperfiltration.

The creation of anaerobic conditions in the membrane filtration unit according to step 2) is preferably carried out by passing nitrogen gas through the membrane filtration unit. Other ways of carrying out step 2) comprise the passing of a gas which contains hardly any oxygen, for example a noble gas such as argon, through the membrane filtration unit. From an economic point of view, it is preferred to use nitrogen gas, which is available on a large scale. According to such a method, the oxygen which is present in the pipes, the pumps, the valves and the like and in the membrane filtration unit, in particular air, is replaced by the inert nitrogen gas, so that anaerobic conditions are created, which anaerobic conditions are necessary for effecting permanent purification of the water to be cleaned.

In another preferred embodiment of the method according to the present invention, the creation of anaerobic conditions in the membrane filtration unit is carried out by passing water with a low oxygen content through the membrane filtration unit. Since the water to be purified is passed through the membrane filtration unit in step 3) of the method according to the present invention, the membrane surface is cleared of oxygen and already moistened by the passage of water with a low oxygen content therethrough. In addition, any air bubbles in the membrane surface will have disappeared after water with a low oxygen content has been passed therethrough. It is preferred to prepare water with a low oxygen content by passing nitrogen gas through water. It should be noted, however, that any gas which contains hardly any oxygen is suitable for preparing water with a low oxygen content. In addition to that, also the principle of vacuum de-aeration is suitable for preparing water with a low oxygen content. It is also possible, however, to prepare water with a low oxygen content by adding a deoxidizer such as bisulphite thereto.

In one preferred embodiment of the method according to the present invention, step 2) is carried out in two stages, that is, first the membrane filtration unit is blown through with nitrogen gas, and then water with a low oxygen content is passed through. It should be apparent that care is taken when changing over from nitrogen gas to water with a low oxygen content that no oxygen can come into contact with the membrane filtration unit, which might make it impossible to obtain optimum anaerobic conditions.

In a special embodiment of the method according to the present invention, it is preferred to have step 3) preceded by a step wherein the water to be purified is first subjected to a pre-purification treatment for the purpose of removing the suspended constituents that may be present therein. The presence of suspended constituents may cause clogging of the membrane surface, which will have an adverse effect on the productivity of the eventual product water. Such a pre-purification treatment preferably takes place by using a so-called candle filter, wherein no contact with the outside air is possible.

It should be apparent on the basis of the above-described preferred embodiments that the creation of anaerobic conditions in a membrane filtration unit is important in particular during the starting phase of the water purification process. The moment the water to be treated is passed through the membrane filtration unit, in which anaerobic conditions have already been created in accordance with the present invention, the supply of nitrogen gas and/or water with a low oxygen content to the membrane filtration unit will be stopped. Since the successive steps of pumping up ground water, possibly passing it through a candle filter, and subsequently pumping it to the membrane filtration unit has in accordance with the method of the present invention taken place without any significant contact with the outside air during the starting phase of the purification of water, in particular ground water, the complete process will be maintained under anaerobic conditions without additional measures being taken, for example the passing through of nitrogen gas. In some embodiments it is not inconceivable, however, to admix a small amount of water with a low oxygen content to the aqueous flow to be purified, which embodiments also fall within the scope of the appended claims. Thus, the present invention is essentially different from the methods according to the prior art as described above.

In a special embodiment of the present method it is preferred to place the membrane filtration unit underground, near a water-carrying package. A water-carrying package, as is understood by those skilled in the art, refers to an underground, or subsurface, body of water flowing in a distinct channel, the channel being naturally defined and bounded by particular strata, the latter usually referring to layers of sedimentary rock. Thus, water is passed along the membrane surface underground, under anaerobic conditions, whereby product water (permeate) is produced as a result of a pressure being applied. The concentrate flow being produced is returned via a pipe, still under anaerobic conditions, to the same "water-carrying" package or to a package in which the salt concentrations are higher than in the layer from which the water was obtained. In this latter embodiment, the layer from which the water is obtained is prevented from becoming contaminated with a water flow (i.e., concentrate flow) comprising higher salt concentrations. Special advantages that may be mentioned are:
  the saving of space; the entire plant can be realized mainly underground,
  the continuous presence of an anaerobic environment, without all kinds of technical measures being required to achieve this,
  the concentrate produced remaining anaerobic, thus allowing for it to be injected without any problems into the same water-carrying package, or, when opting for a higher yield from the plant and, consequently, a higher salt concentration in the concentrate flow, to be injected into a water-carrying package comprising comparable salt concentrations (mostly salt water strata), and
  the ability to opt for low yields, for example, where the original feed water flow yields material that is 10–20% product water and 80–90% concentrate flow, In such an embodiment, taking into consideration the gigantic volume of a water-carrying package, the concentrate flow could be injected into the same stratum, for example, a few hundred meters "downstream."

Although European patent application No. 0 297 417 discloses a subsurface filter pipe, it is not known therefrom to create the anaerobic conditions that are important according to the present invention.

The present invention furthermore relates to a device for purifying water, in particular ground water, using a membrane filtration unit which is provided with the necessary valves, supply and discharge pipes and pumps, which device is characterized in that a rinsing unit for creating anaerobic conditions is disposed before the membrane filtration unit, which rinsing unit is connected, via a flushing pipe, to the supply pipe for the water to be purified to the membrane filtration unit, whereby the supply pipe—flushing pipe connection can be shut off.

The rinsing unit for creating anaerobic conditions is preferably connected to the supply pipe for the water to be purified to the membrane filtration unit. According to such a construction, no "dead" pipes will be created in the present device, which "dead" pipes contain oxygen, and which may cause biological growth and flocculation of iron and manganese hydroxides, therefore. By placing a three-way valve, for example, in the supply pipe for water to be purified to the membrane filtration unit, it will be easy to change over from step 2) to step 3) of the present invention without any risk of ingress of outside air.

The membrane filtration unit to be used in accordance with the present invention is in particular not critical, reverse osmosis (also known as hyperfiltration), nanofiltration as well as ultrafiltration and microfiltration can be used. It is preferred, however, to use nanofiltration or reverse osmosis, in connection with the removal of particles having a particle size of less than about 10 nm. Thus, dissolved ions and organic components are stopped by means of nanofiltration and hyperfiltration.

In one preferred embodiment of the device according to the present invention, the rinsing unit for creating anaerobic conditions comprises a pipe for supplying nitrogen gas and/or a pipe for supplying water with a low oxygen content, wherein both pipes are connected to the supply pipe for the water to be purified to the membrane filtration unit. According to such an embodiment it is possible in a simple manner to create anaerobic conditions in the membrane filtration unit by first blowing through the supply pipe and the membrane filtration unit with nitrogen gas and subsequently passing water with a low oxygen content through the supply pipe and the membrane filtration unit. It is also possible, however, to blow through nitrogen gas and pass water with a low oxygen content via one pipe, which is connected to the supply pipe for water to be purified to the membrane filtration unit.

If the water to be purified contains suspended constituents which may cause clogging of the membrane surface, it is preferred for the device according to the present invention to comprise a pre-purification unit. Such a pre-purification unit for removing suspended constituents is preferably disposed before the rinsing unit for creating anaerobic conditions. It is preferred to use one or more candle filters as a pre-purification unit. From practice it has become apparent that suspended constituents oxidize rather easily and will cause problems once they have come into contact with oxygen, so that it is recommended to remove such suspended constituents from the water to be treated before the anaerobic conditions are created. It is also possible, however, to rinse such a pre-purification unit, using the rinsing unit.

In a special embodiment of the present invention it is preferred to dispose the membrane filtration unit underground, near a water carrying package, whereby it is furthermore preferred to return the obtained concentrate flow, via a discharge pipe, to the same water carrying package as that in which the membrane filtration unit is disposed. It is also possible, however, to return the concentrate flow, via a discharge pipe, to a water carrying package other than that in which the membrane filtration unit is disposed.

The present invention furthermore relates to drinking water obtained by using a membrane filtration unit, which drinking water is characterized in that it has been obtained by using the method and/or the device according to the present invention.

The present invention will be explained hereafter by means of examples and the appended drawings, whereby it should be noted that the present invention is by no means limited to a special example.

FIG. 1 schematically shows the device according to the present invention.

FIG. 2 schematically shows a preferred embodiment of the device according to the present invention.

Figure 1:
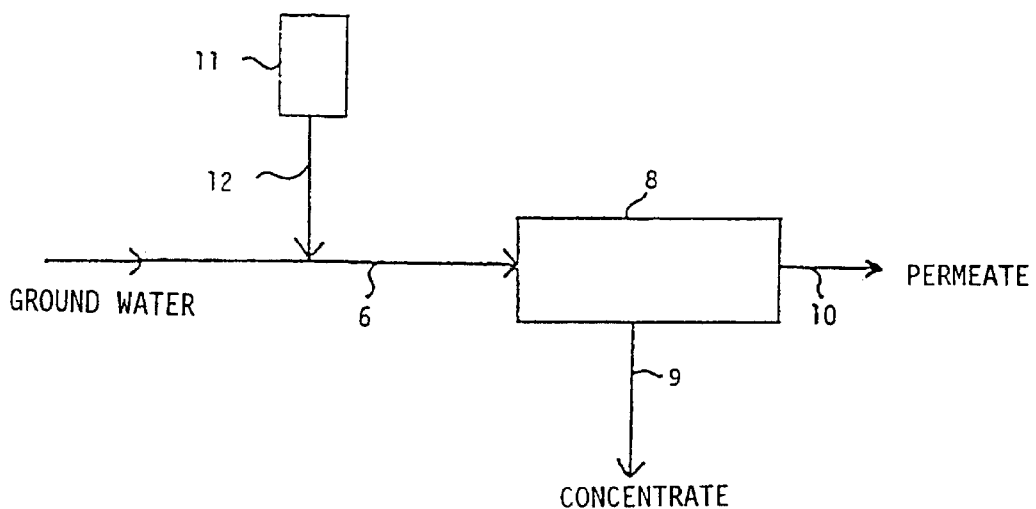
Figure 2:
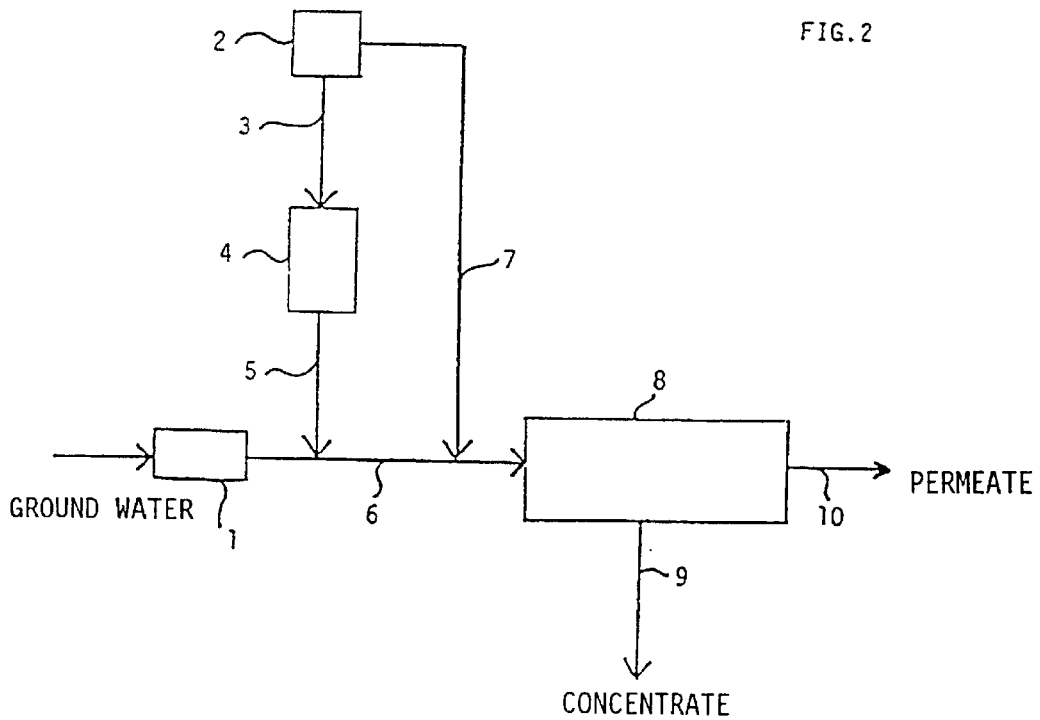

The purification of water as described in the examples below has been carried out in the device according to FIG. 2. It should be noted, however, that the comparative example was carried out under aerobic conditions, which means that anaerobic conditions (no oxygen) did not prevail in the device. In FIG. 1, the present rinsing unit 11 is connected to supply pipe 6 via pipe 12, which supply pipe 6 carries the water to be purified to membrane filtration unit 8, wherein a separation into permeate 10 and concentrate 9 takes place. As already described before, rinsing unit 11 functions to create anaerobic conditions in membrane filtration unit 8, and consequently it may comprises a nitrogen gas pipe, a pipe for anoxic water or low-oxygen water, a vacuum de-aeration unit and the like, as already described in the introduction to the description. For the sake of clarity, the process flows are shown schematically in the appended FIG. 2, wherein the necessary valves, pumps and the like have been left out for easy reference. Ground water is pumped up according to FIG. 2 and supplied to candle filter 1, in which candle filter 1 suspended constituents are removed. It should be apparent that the presence of such a candle filter 1 is not absolutely necessary. If the pumped-up ground water contains a small amount of suspended constituents, it is also possible to supply ground water directly to membrane filtration unit 8. According to the present invention it is preferred to supply first nitrogen gas and then water with a low oxygen content in order to create anaerobic conditions in membrane filtration unit 8. The supply of nitrogen gas takes place by supplying nitrogen gas from gas reservoir 2, via pipe 7, to membrane filtration unit 8. The in situ preparation of anoxic water or low-oxygen water for example takes place by supplying nitrogen gas from reservoir 2, via pipe 3, to reservoir 4, in which water is present. It is also possible to mount a nitrogen gas recirculation pipe (not shown) on reservoir 4. The water, through which nitrogen gas has thus been passed, is supplied to membrane filtration unit 8 via pipe 5. After anaerobic conditions have thus been created in membrane filtration unit 8, the water to be purified is supplied via pipe 6, and the supply of nitrogen gas via pipe 7 and/or water with a low oxygen content via pipe 5 to pipe 6 is stopped. The anaerobic conditions have been achieved and will be maintained, so that the present rinsing unit can be disconnected. After membrane filtration unit 8 has been flushed out, preferably with nitrogen gas via pipe 7 and with water with a low oxygen content via pipe 5 respectively, the pumped-up ground water is supplied to membrane filtration unit 8 via pipe 6. According to the present invention, the assembly of pipes 3, 5, 7 and reservoirs 2, 4 is also called rinsing unit. It should be apparent that the object of the present rinsing unit is to create anaerobic conditions, and that this may take place under wet conditions, namely via pipe 5, and/or dry conditions, via pipe 7, but the rinsing unit not being limited thereto. In membrane filtration unit 8, in which anaerobic conditions have thus been created already, a separation into permeate and concentrate takes place, whereby permeate is discharged via pipe 10 and concentrate is discharged via pipe 9. By first creating anaerobic conditions in membrane filtration unit 8 and subsequently passing the ground water to be purified through membrane filtration unit 8, whereby the anaerobic conditions obtained are maintained, the pores of the membrane surface are prevented from becoming clogged. Thus a continuous permeate flow 10 is ensured.

EXAMPLE 1

Figure 3:
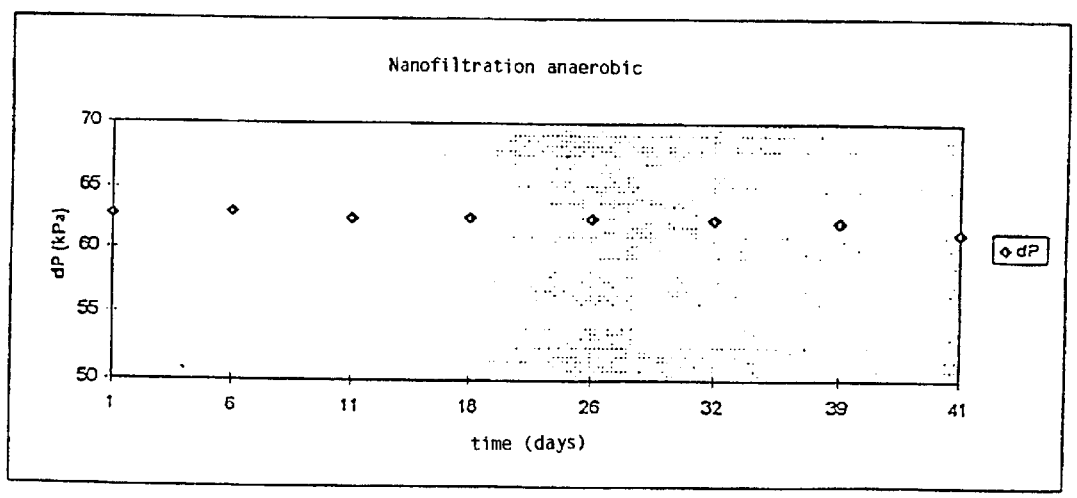
FIG. 3 shows the pressure drop set off against time, with the values being obtained from purification of ground water in a nanofiltration unit under anaerobic conditions.

Ground water was supplied to a membrane filtration unit, in which anaerobic conditions had already been created, whereby the membrane filtration unit had been flushed first with nitrogen gas and subsequently with water with a low oxygen content. The changeover from water with a low oxygen content to pumped-up ground water was made in such a manner that no air was introduced into the system. A nanofiltration unit was used as the membrane filtration unit. The appended FIG. 3 clearly shows that the pressure drop across the nanofiltration unit was constant for 40 days, and that it amounted to approximately 60 kPa. The permeate flow obtained from the nanofiltration unit possessed a constant quality for the whole duration of the experiment.

EXAMPLE 2

Figure 4:
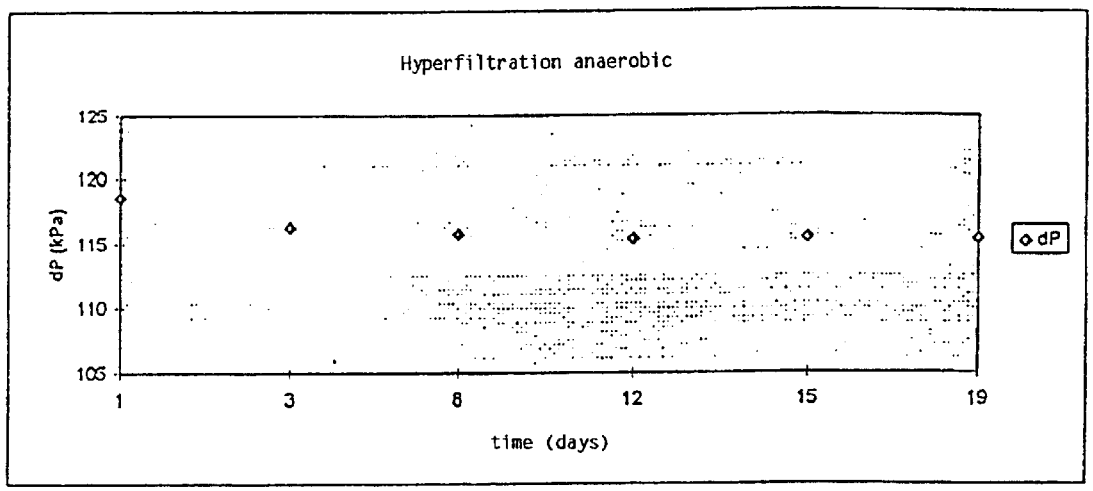
FIG. 4 shows the same parameters as in FIG. 3, whereby the purification of ground water has been carried out under anaerobic conditions, using a hyperfiltration unit, however.

The same operations as in example 1 were carried out as regards the creation of anaerobic conditions in the membrane filtration unit, with this exception that a hyperfiltration unit was used as the membrane filtration unit. From the appended FIG. 4 it is apparent that the pressure drop across the hyperfiltration unit was constant for the entire duration of the experiment, namely about 115 kPa. The quality of the permeate flow from the hyperfiltration unit remained constant throughout the experiment. It should be noted that in example 1 as well as in example 2 the water flux remained constant throughout the experiment. The water flux is defined as the total amount of product water (permeate flow) which is produced in l/hour divided by the membrane area in $m^2$, which value represents a unit of liters per square meter per hour. A constant water flux at a constant feed pressure indicates that no clogging of the membrane surface occurs.

COMPARATIVE EXAMPLE 1

Figure 5:
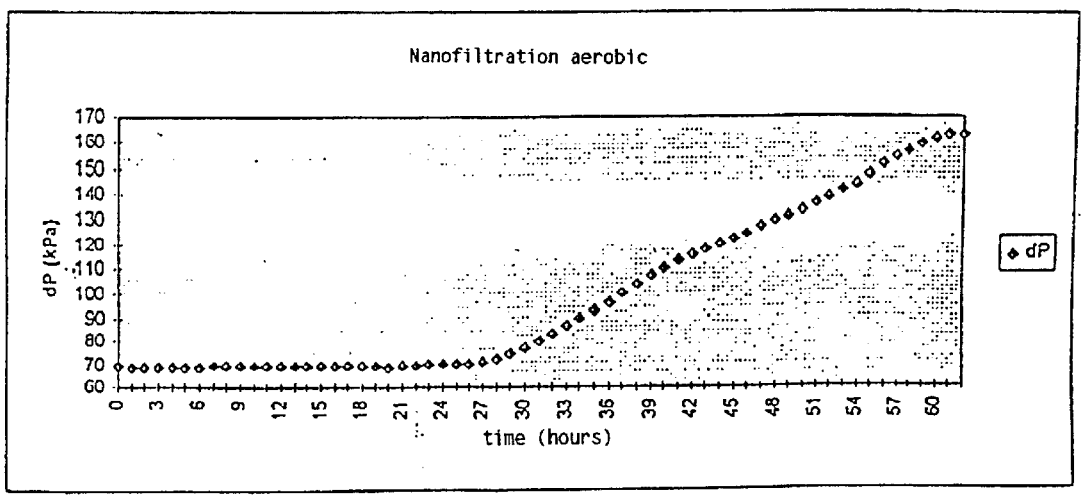
FIG. 5 shows the same parameters as in FIGS. 3 and 4, whereby the purification of ground water has been carried out under aerobic conditions from a certain point in time, using a nanofiltration unit.

The same membrane filtration unit as described in example 1 was used. In this comparative example 1, however, the nanofiltration unit was used under aerobic conditions. From the appended FIG. 5 it is apparent that the pressure drop across the membrane surface quickly increased from about 70 kPa to 160 kPa after 30 hours. The purification of the ground water was stopped, because the maximum allowable pressure drop across the nanofiltration membrane elements had been reached. In addition to that, the water flux decreased from the original value of 33 l/m$^2$ per hour to 8 l/M$^2$ per hour, due to the fact that the membrane pores had become clogged by the iron and manganese flocks that had formed that ingress of oxygen had taken place. This comparative example shows that in order to prevent clogging of the membrane pores, it is essential not only to create anaerobic conditions, but also to maintain said conditions, irrespective of the selected type of membrane filtration unit, that is, nanofiltration or hyperfiltration.

What is claimed is:

1. A method for creating anaerobic conditions in a membrane filtration unit used for water purification, comprising the following steps:
   1) connecting the membrane filtration unit to a rinsing unit; then
   2) passing a rinsing agent from the rinsing unit through the membrane filtration unit so as to create anaerobic conditions in the membrane filtration unit during the initial phase of the water purification process; and
   3) passing the water to be purified through the membrane filtration unit, in which anaerobic conditions have thus been created in step 2), wherein the connection between the membrane filtration unit and the rinsing unit is then shut off so that the anaerobic conditions in the membrane filtration unit obtained in step 2) are maintained while the water to be purified is passed through the membrane filtration unit, contact between the water to be purified and outside air being prevented during the water purification process.

2. A method according to claim 1 wherein ground water is used in step 3) as the water to be purified, and wherein the ground water is supplied to the membrane filtration unit directly after being pumped up, without coming into contact with the outside air.

3. A method according to claim 1 wherein step 2) is carried out by using nitrogen gas as the rinsing agent.

4. A method according to claim 1 wherein step 2) is carried out by using water with a low oxygen content as the rinsing agent.

5. A method according to claim 4 wherein the water with a low oxygen content is obtained by passing nitrogen gas through water.

6. A method according to claim 4 wherein the water with a low oxygen content is obtained by de-aerating water, using a vacuum de-aerating device.

7. A method according to claim 4 wherein the water with a low oxygen content is obtained by adding a deoxidizer thereto.

8. A method according to claim 1 wherein the rinsing agent is a first rinsing agent comprising nitrogen and a second rinsing agent comprising, water with a low oxygen content, and wherein both first and second rinsing agents are sequentially passed through the membrane filtration unit.

9. A method according to claim 1 wherein step 3 is preceded by the step of subjecting the water to be purified to a pre-purification treatment for the purpose of removing suspended constituents.

10. A method according to claim 9 wherein the pre-purification treatment is carried out by using one or more candle filters.

11. A method according to claim 1 wherein a munofiltration unit is used as the membrane filtration unit.

12. A method according to claim 1 wherein a hyperfiltration unit is used as the membrane filtration unit.

13. A method according to claim 1 wherein the membrane filtration unit is disposed underground, near a water-carrying package.

14. A method according to claim 13 wherein the concentrate flow obtained at the membrane filtration unit is returned to the water-carrying package.

15. A method according to claim 14 wherein the return of the concentrate flow takes place under essentially anaerobic conditions.

16. A method according to claim 13 wherein the concentrate flow obtained at the membrane filtration unit is returned to the water-carrying package, at a location downstream of the membrane filtration unit.

17. A method according to claim 13 wherein the concentrate flow obtained at the membrane filtration unit is returned to another water-carrying package.

18. A method according to claim 1 wherein, after the creation of anaerobic conditions in the membrane filtration unit during the initial abase of the water purification process, the anaerobic conditions are maintained by adding water with a low oxygen content to the water to be purified.

* * * * *

UNITED STATES PATENT AND TRADEMARK OFFICE
CERTIFICATE OF CORRECTION

PATENT NO. : 6,395,182 B1  Page 1 of 1
DATED : May 28, 2002
INVENTOR(S) : Jacobus Cornelis Van Winkelen et al.

It is certified that error appears in the above-identified patent and that said Letters Patent is hereby corrected as shown below:

Title page,
Item [73], Assignee, "Barrett Enclosures, Inc., Seattle, WA (US)" should read
-- N.V. Waterleiding Friesland, Leeuwarden (NL) --.

Column 10,
Line 9, "wherein step 3 is" should read -- wherein step 3) is --.
Lines 17 and 18, "wherein a munofiltration unit" should read -- wherein a nanofiltration unit --.
Line 39, "during the initial abase" should read -- during the initial phase --.

Signed and Sealed this

Twenty-first Day of January, 2003

JAMES E. ROGAN
*Director of the United States Patent and Trademark Office*